United States Patent
Yamauchi et al.

(10) Patent No.: US 8,704,143 B2
(45) Date of Patent: Apr. 22, 2014

(54) IMAGE PROJECTION APPARATUS UTILIZING REFLECTIVE IMAGE DISPLAY ELEMENT AND PLURAL PARALLEL PLATES FOR A PLURALITY OF COLOR LIGHT (AS AMENDED)

(75) Inventors: Yu Yamauchi, Yokohama (JP); Kazuhiro Inoko, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 240 days.

(21) Appl. No.: 13/190,682

(22) Filed: Jul. 26, 2011

(65) Prior Publication Data

US 2012/0019787 A1   Jan. 26, 2012

(30) Foreign Application Priority Data

Jul. 26, 2010 (JP) ................. 2010-167195

(51) Int. Cl.
  *H01L 27/00* (2006.01)
(52) U.S. Cl.
  USPC .......................................... 250/208.1; 353/31
(58) Field of Classification Search
  USPC ................... 250/208.1, 226, 216; 353/30, 31; 359/487–489, 495–501, 629–640, 831, 359/834; 349/9, 18
  See application file for complete search history.

(56) References Cited

U.S. PATENT DOCUMENTS

| 6,089,717 | A | * | 7/2000 | Iwai ................................ 353/31 |
| 7,287,861 | B2 | | 10/2007 | Nakayama | |
| 2005/0243279 | A1 | | 11/2005 | Kobayashi | |
| 2006/0044514 | A1 | | 3/2006 | Ushigome | |
| 2006/0256289 | A1 | | 11/2006 | Fukuzaki | |

FOREIGN PATENT DOCUMENTS

| CN | 1721963 A | 1/2006 |
| JP | 2005-283663 A | 10/2005 |
| JP | 2006-047903 A | 2/2006 |
| JP | 2006-047967 A | 2/2006 |
| JP | 2006-145943 A | 6/2006 |
| JP | 2006-343692 A | 12/2006 |
| JP | 2008-122949 A | 5/2008 |
| JP | 2009-288437 A | 12/2009 |
| TW | I262326 B | 9/2006 |

OTHER PUBLICATIONS

Extended European Search Report issued in counterpart application No. 11006023.3 dated Nov. 25, 2011.
CN OA issued Aug. 2, 2013 for corres. CN 201110212385.4.
Japanese Office Action for corresponding JP 2010-167195, mail date Feb. 25, 2014.

* cited by examiner

Primary Examiner — Que T Le
(74) Attorney, Agent, or Firm — Rossi, Kimms & McDowell LLP

(57) ABSTRACT

An image projection apparatus includes a beam splitter configured to split light from a light source into first color light and second color light, a first reflective image display element configured to optically modulate the first color light, a second reflective image display element configured to optically modulate the second color light, a first parallel plate arranged between the beam splitter and the first reflective image display element and made of a large refractive index wavelength dispersion, and a second parallel plate arranged between the beam splitter and the second reflective image display element and made of a large refractive index wavelength dispersion.

15 Claims, 6 Drawing Sheets

IMAGE PROJECTION APPARATUS UTILIZING REFLECTIVE IMAGE DISPLAY ELEMENT AND PLURAL PARALLEL PLATES FOR A PLURALITY OF COLOR LIGHT (AS AMENDED)

BACKGROUND OF THE INVENTION

1. Field of the Invention

The present invention relates to an image projection apparatus that utilizes a reflective image display element.

2. Description of the Related Art

An image projection apparatus utilizing a reflective image display element has a known problem in that light that is to totally transmit through a polarization splitting film of a polarization beam splitter is partially reflected on the polarization splitting film, and a small amount of reflected light and the transmitting light generate an interference pattern.

Accordingly, each of Japanese Patent Laid-Open Nos. 2006-047967 and 2006-343692 arranges two image display elements unequally distant from the polarization splitting film so as to reduce the interference pattern. In addition, these references provide a projection lens with a longitudinal chromatic aberration corresponding to a shift amount of the image display element, and prevent blurs of an image (of at least one color) by shifting the positions of the two image display element in defocus directions.

Japanese Patent Laid-Open Nos. 2006-047967 and 2006-343692 can reduce the interference pattern, but the color blurs in at least one band and that color's resolution deteriorates since they provide the longitudinal chromatic aberration to the projection lens.

SUMMARY OF THE INVENTION

The present invention provides an image projection apparatus which can restrain a generation of an interference pattern, and reduce color blurs.

A projection-type display apparatus according to the present invention includes a projection lens configured to project an image onto a projection surface, a beam splitter configured to split light from a light source into first color light and second color light, a first reflective image display element configured to optically modulate the first color light, a second reflective image display element configured to optically modulate the second color light, a first parallel plate arranged between the beam splitter and the first reflective image display element, and a second parallel plate arranged between the beam splitter and the second reflective image display element. The following expressions are satisfied where n11 is a refractive index of the first parallel plate for a gravity center wavelength λ1 of the first color light, n12 is a refractive index of the first parallel plate for a gravity center wavelength λ2 of the second color light, n21 is a refractive index of the second parallel plate for a gravity center wavelength λ1 of the first color light, n22 is a refractive index of the second parallel plate for a gravity center wavelength λ2 of the second color light, D1 (μm) is a thickness of the first parallel plate in an optical axis direction, D2 (μm) is a thickness of the second parallel plate in the optical axis direction, T1 (μm) is a longitudinal chromatic aberration of the gravity center wavelength λ1 of the first color light based on a gravity center wavelength λ3 of third color light different from each of the first color light and the second color light, T2 (μm) is a longitudinal chromatic aberration of the gravity center wavelength λ2 of the second color light based on the gravity center wavelength λ3 of third color light, and L (μm) is a coherent distance of the light source.

$$5L \geq \mathrm{ABS}\left\{(T_1 - T_2) + D_2 \times \left(\frac{1}{n_{22}} - \frac{1}{n_{21}}\right)\right\} \geq \frac{L}{2}$$

$$5L \geq \mathrm{ABS}\left\{(T_2 - T_1) + D_1 \times \left(\frac{1}{n_{11}} - \frac{1}{n_{12}}\right)\right\} \geq \frac{L}{2}$$

$$-20 \ \mu m \leq T_1 \leq 20 \ \mu m$$

$$-20 \ \mu m \leq T_2 \leq 20 \ \mu m$$

The gravity center wavelength is a wavelength corresponding to a center of gravity calculated from a product between a spectrum of a light flux emitted from the image projection apparatus and a color matching function.

Further features of the present invention will become apparent from the following description of exemplary embodiments with reference to the attached drawings.

DESCRIPTION OF THE EMBODIMENTS

Figure 1:
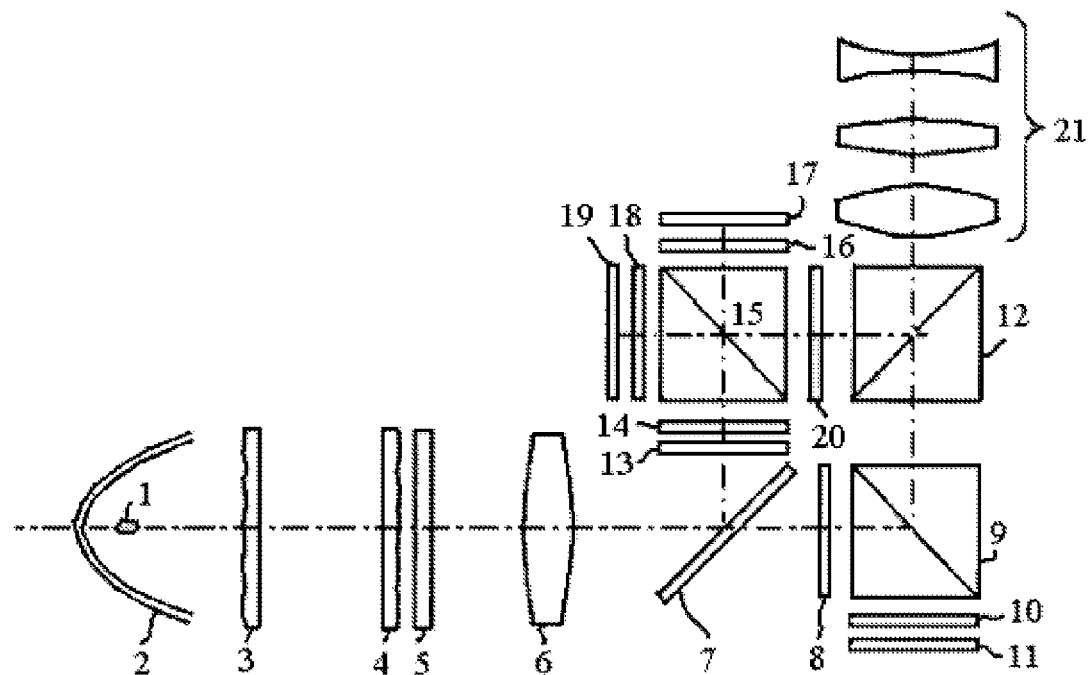
FIG. 1 illustrates a structure of an image projection apparatus of this embodiment.

A detailed description will now be given of embodiments this embodiment with reference to the accompanying drawings. Those elements in each figure, which are the same as corresponding elements, will be labeled by the same reference numeral, and a duplicate description thereof will be omitted.

This embodiment addresses lengths of two optical paths which cause interference, provides an optical synthesis system with a proper optical length that can reduce an aberration, and maintains a leak-light generating optical system in a non-interference state.

First Embodiment

FIG. 1 illustrates a structure of an image projection apparatus of this embodiment.

Figure 2:
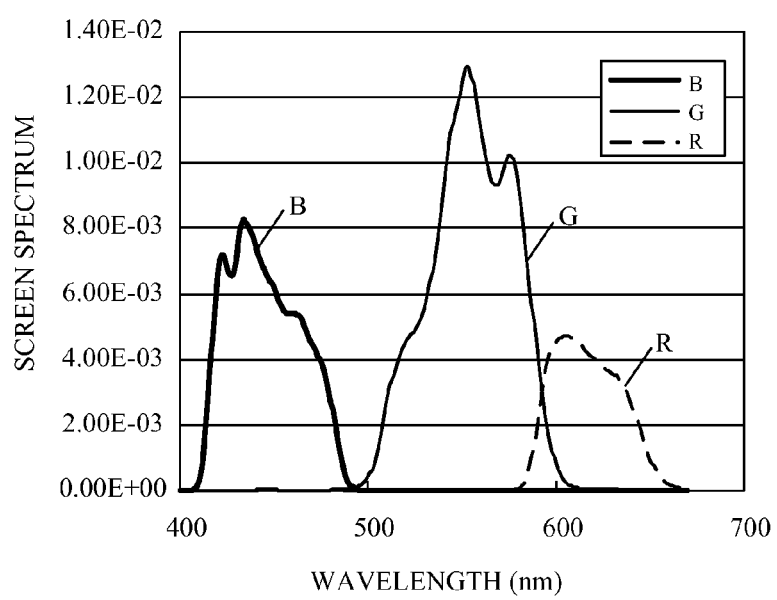
FIG. 2 is a graph illustrating a (screen) spectrum of a light flux emitted from the image projection apparatus of this embodiment.
Figure 3:
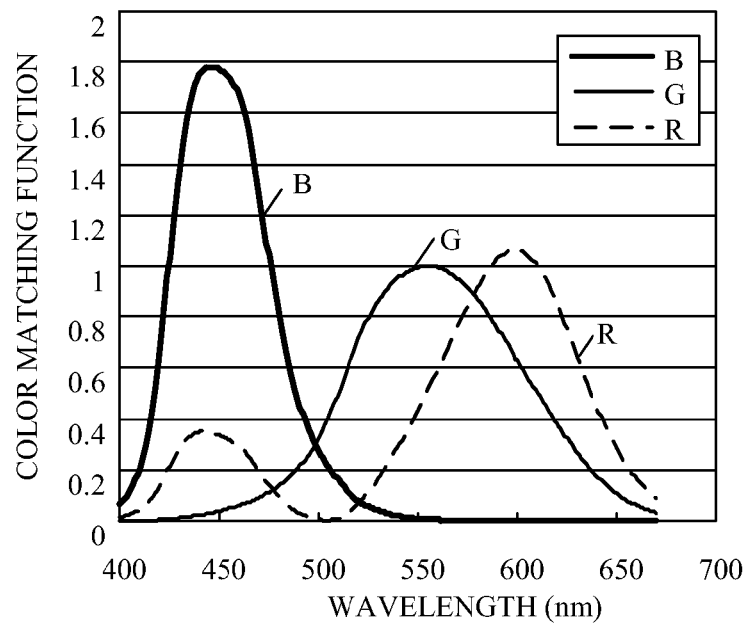
FIG. 3 is a graph illustrating RGB color matching functions.
Figure 4:
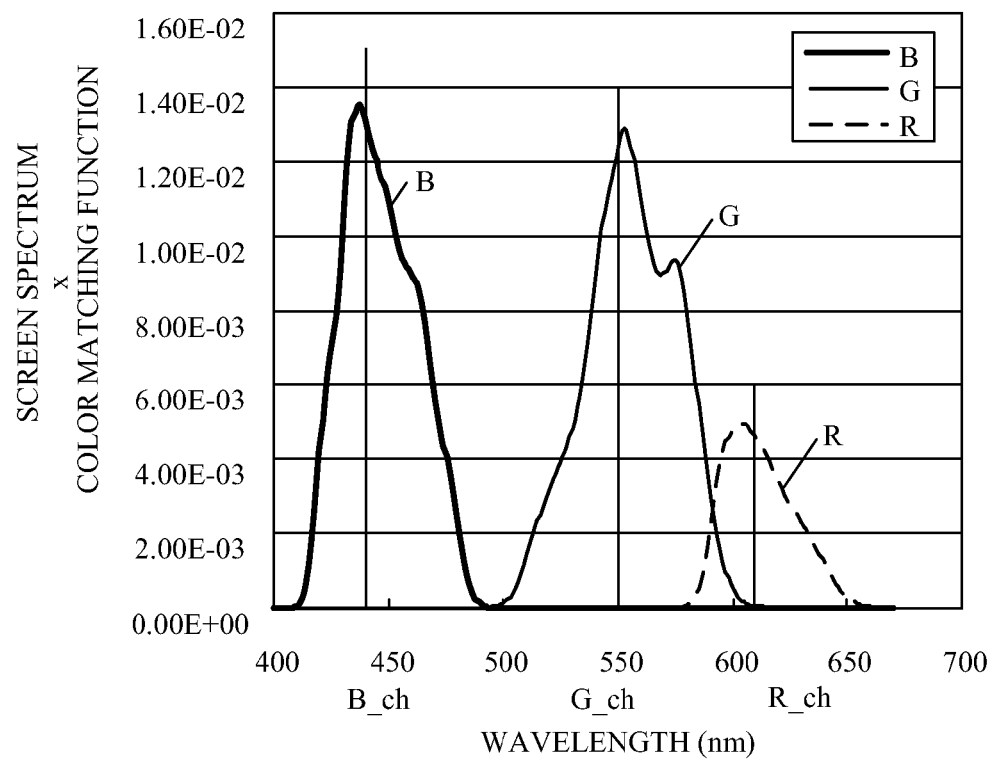
FIG. 4 is a graph illustrating a product between the screen spectrum illustrated in FIG. 2 and the color matching function illustrated in FIG. 3, and gravity center wavelengths.

A description will now be given of a function of each component and a variety of definitions used for this embodiment. A polarization beam splitter (also referred to as a "PBS" hereinafter) has a characteristic in that it allows p-polarized light to transmit through it and reflects s-polarized light. A wavelength selective phase plate has a characteristic of rotating a phase of a predetermined wavelength band. In addition, blue color light is referred to as B light (first color light or blur band), green color light is referred to as G light (third color light or green band), and red color light is referred to as R light (second color light or red band). The B light has a gravity center wavelength $\lambda 1$ of 440 nm, the G light has a gravity center wavelength $\lambda 3$ of 550 nm, and the R light has a gravity center wavelength $\lambda 2$ of 620 nm. The gravity center wavelength, as used herein, means a wavelength corresponding to a center of gravity calculated from a product between a screen spectrum that is a spectrum of the light flux emitted from the projector illustrated in FIG. 2 and a corresponding color matching function illustrated in FIG. 3. The screen spectrum illustrated in FIG. 2 is obtained by measuring light emitted from the projector using a spectroradiometer and a scattering plate. FIG. 4 is a product between each color light (B light, G light, and R light) illustrated in FIG. 2, and each color light of the color matching function illustrated in FIG. 3. Wavelengths corresponding to lines crossing the abscissa axis of FIG. 4 indicate gravity center wavelengths of the respective wavelength bands. The gravity center is calculated from the weighted average of each wavelength band illustrated in FIG. 4.

In FIG. 1, reference numeral 1 denotes a light source, which uses a high pressure mercury lamp in this embodiment. Reference numeral 2 denotes a parabolic reflector, reference numeral 3 denotes a first lens eye, and reference numeral 4 denotes a second lens array. Reference numeral 5 denotes a polarization converter, and reference numeral 6 denotes a condenser lens. The "lens array," as used herein, means an optical element in which a plurality of micro lenses are arranged. Reference numeral 7 denotes a dichroic mirror that serves as a color splitter, reference numeral 8 denotes a polarizing plate, and reference numeral 9 denotes a polarization beam splitter configured to allow the p-polarized light to transmit through its polarization splitting plane, and to reflect the s-polarized light on the polarization splitting plane. Polarization splitting films are laminated on the polarization splitting plane. Reference numeral 10 denotes a phase plate, and reference numeral 11 denotes a G-use image display element configured to optically modulate the G light. A more specific element of the image display element in this embodiment is a reflective liquid crystal display element LCOS, a DMD element (DLP), etc. Reference numeral 13 denotes a polarizing plate. Reference numeral 14 denotes a wavelength selective phase plate configured to rotate the polarization direction of only the B light by 90°. Reference numeral 15 denotes a polarization beam splitter configured to allow the p-polarized light to transmit through its polarization splitting plane, and to reflect the s-polarized light on the polarization splitting plane. Reference numeral 16 denotes a phase plate. Reference numeral 17 denotes a B-use image display element (first reflective image display element) configured to rotate the polarization direction of only the B light by 90°. Reference numeral 18 denotes a phase plate. Reference numeral 19 denotes an R-use image display element (second reflective image display element) configured to optically modulate the R light. Reference numeral 20 denotes a wavelength selective phase plate configured to rotate only the R light by 90°. Reference numeral 12 denotes a polarization beam splitter configured to allow the p-polarized light to transmit through its polarization splitting plane, and to reflect the s-polarized light on the polarization splitting plane. Reference numeral 21 denotes a projection lens (projection optical system) configured to project an image onto a projection surface.

Figure 5:
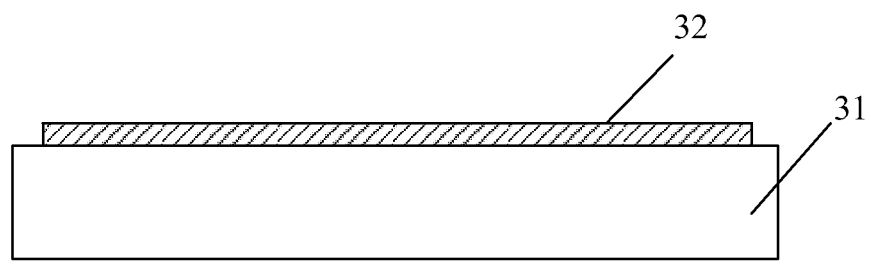
FIG. 5 illustrates a structure of a phase plate used for a first embodiment.

The phase plates 10, 16, and 18 are structured as illustrated in FIG. 5 in which a film 32 is adhered onto one surface of a parallel plate 31. In this embodiment, each of the parallel plate 31 (first parallel plate) used for phase plate 16 and the parallel plate 31 (second parallel plate) used for phase plate 18 has the same thickness D of 1.5 mm, and is made of the same glass material S-TIH53. The parallel plate 31 for each of the phase plates 16, 18 is conventionally made of an inexpensive white plate glass, but this embodiment utilizes a high-dispersion glass material S-TIH53. This embodiment characteristically arranges a glass material having a refractive index wavelength dispersion in a single optical path between the polarization beam splitter 15 and each image display element, and utilizes a high dispersion glass material for the parallel plate 31, avoiding an interference pattern as described later. While this embodiment utilizes the same material for the parallel plate 31 between the phase plates 16, 18, the glass material of the parallel plate 31 for the phase plate 16 may be different from that for the phase plate 18 as in a third embodiment, which will be described later. In other words, a proper glass material may be used for each of the phase plates 16 and 18 for the transmittance to the R or B light, costs, etc. of the glass material of the parallel plate 31. More specifically, the high dispersion glass material used for the parallel plate 31 for the phase plate 16 (B optical path) may be S-TIH53, and the high dispersion glass material used for the parallel plate 31 for the phase plate 18 (R optical path) may be such a different material as S-LAH79. The glass material S-LAH79 has a large refractive index wavelength dispersion but its transmittance to the B band is too low for the phase plate 16 (B optical path). In addition, the parallel plate for phase plate 16 may have a thickness different from that of the parallel plate for phase plate 18.

Figure 6:
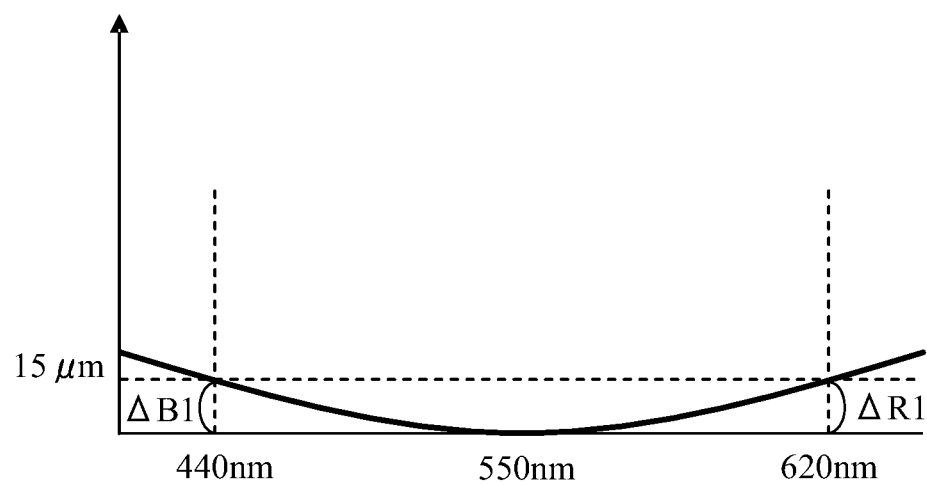
FIG. 6 illustrates a characteristic of a longitudinal chromatic aberration of a projection lens used for the first embodiment.

The refractive index of each wavelength of the glass material S-TIH53 used for this embodiment is 1.894 for 440 nm and 1.841 for 620 nm. FIG. 6 illustrates a characteristic of the longitudinal chromatic aberration of the projection lens 21 used for this embodiment. In the graph, this characteristic is expressed as an imaging position of each wavelength on the basis of the imaging position of the gravity center wavelength 550 nm of the G light. In this illustration, a longitudinal chromatic aberration amount $\Delta B1$ for the gravity center wavelength $\lambda 1$ (440 nm) of the B light and a longitudinal chromatic aberration amount $\Delta R1$ for the gravity center wavelength $\lambda 2$ (620 nm) of the R light have the same value of 15 μm.

A description will be given of a determination of a fixing position of the image display element which is important in implementing this embodiment.

The fixing position of the image display element corresponding to each color light is determined based on the gravity center wavelength of each color light.

Since the longitudinal chromatic aberration based on the gravity center wavelength 550 nm of the G light of the projection lens used for this embodiment is the same between the gravity center wavelength 440 nm of the B light the gravity center wavelength 620 nm of the R light as illustrated in FIG. 6, each corresponding optical path has the same optical path length. In other words, the image display element of each color light is fixed onto that position.

Figure 7:
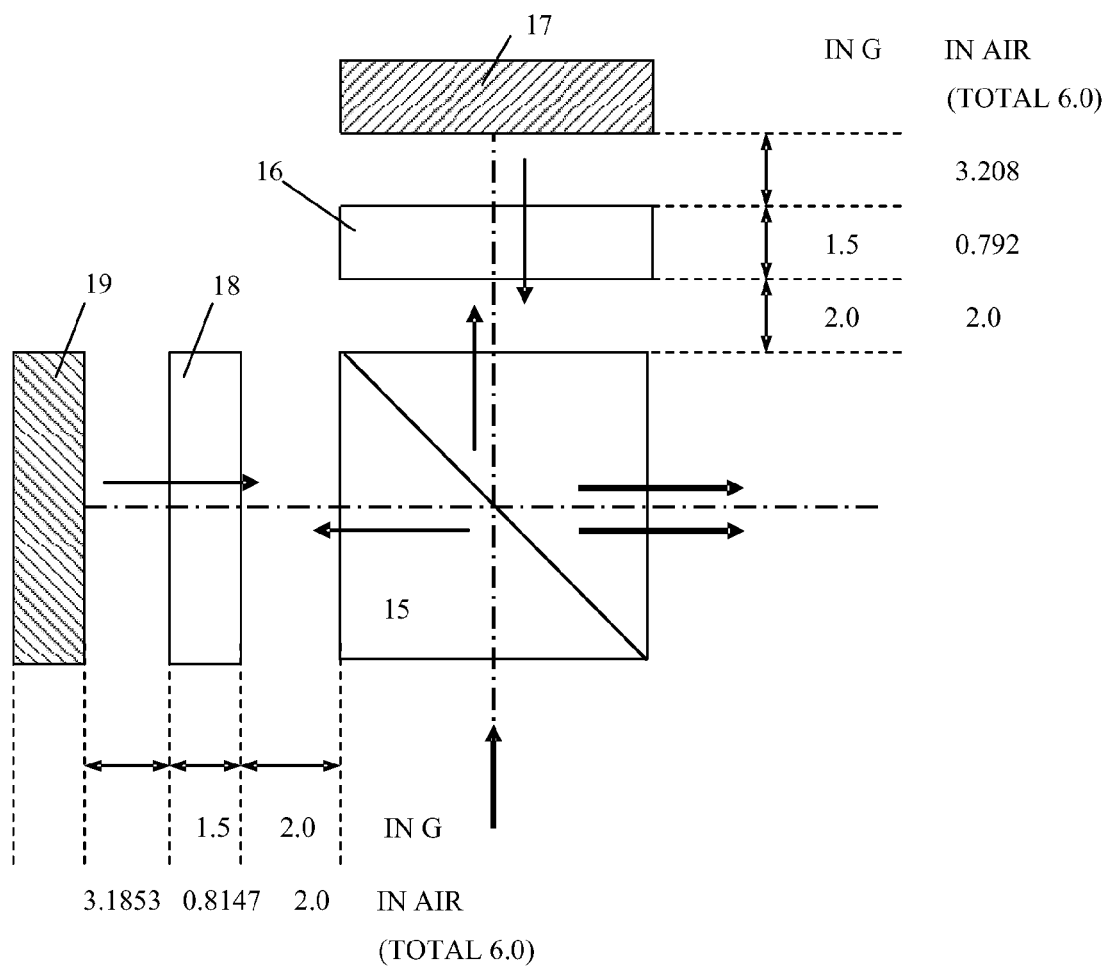
FIG. 7 illustrates an arrangement among a polarization beam splitter, phase plates, and image display elements according to the first embodiment.

This method will be discussed in more detail with reference to FIG. 7. FIG. 7 illustrates an arrangement among the polarization beam splitter 15, the phase plates 16, 18, and the image display elements 17, 19 of this embodiment. Distances from the polarization beam splitter 15 to the phase plates 16, are 2.0 mm. When a distance (in air) from the polarization beam splitter 15 to each of the image display elements 17 and 19 is 6 mm, the image display element 17 is fixed at a position in which a distance between the phase plate 16 and the B-use image display element 17 is 3.208 mm. The image display element 19 is fixed at a position in which a distance between the phase plate 18 and the R-use image display element 19 is 3.1853 mm. Table 1 summarizes numerical values.

TABLE 1

Fixing positions of the B and R panels

| | B panel fixing position | | | R panel fixing position | | |
|---|---|---|---|---|---|---|
| | d | n | In air | d | n | In air |
| PBS-phase plate | 2 | 1 | 2 | 2 | 1 | 2 |
| Phase plate | 1.5 | 1.894 | 0.792 | 1.5 | 1.841 | 0.8147 |
| Phase plate to panel | 3.208 | 1 | 3.208 | 3.1853 | 1 | 3.1853 |
| Total | | | 6.00 | | | 6.00 |

*Unit of d in Table 1 is millimeter

This embodiment uses the same glass material, and the same thickness d of 1.5 mm for the phase plates 16 and 18. While the phase plate includes the parallel plate 31 and the film 32, as described above, the film 32 is very thin and thus the thickness d of the phase plate means a thickness of the parallel plate 31 in this embodiment. Here, is a refractive index. Even when the phase plates 16 and 18 are made of the same glass material, the refractive index (1.894) to the gravity center wavelength of the B light is different from the refractive index (1.841) to the gravity center wavelength of the R light. Thus, the refractive index n of the phase plate (parallel plate 31) is differently illustrated in Table 1.

A description will now be give of a generation of an interference pattern.

Figure 8:
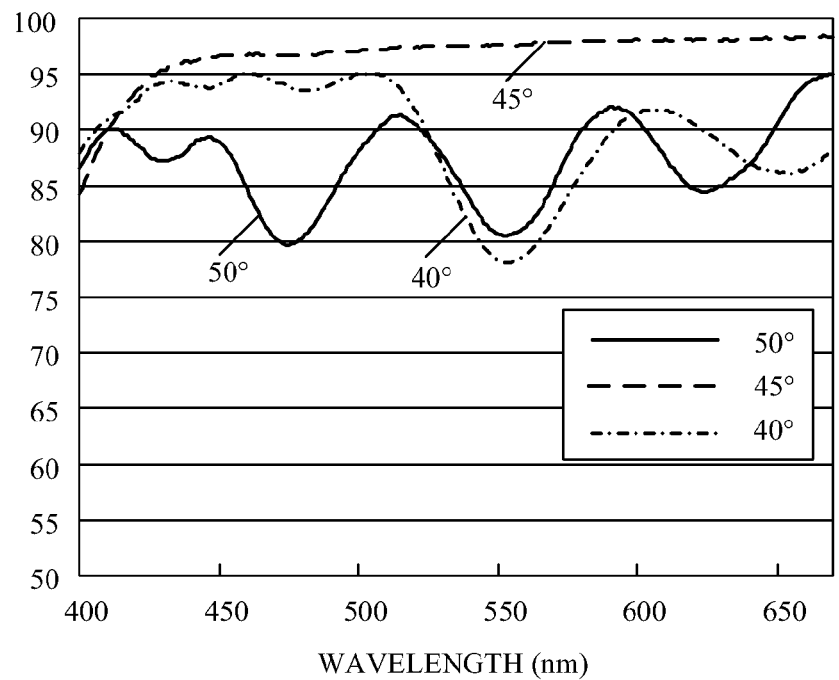
FIG. 8 illustrates a characteristic of the polarization beam splitter of this embodiment.
Figure 8:
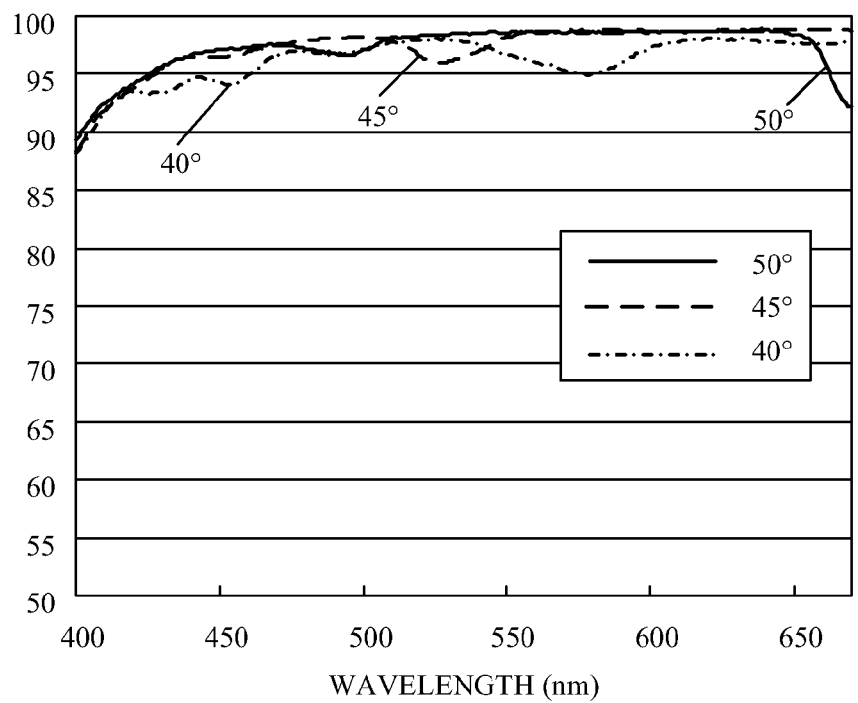

None of currently available optical components, such as a wavelength selective phase plate, a polarization beam splitter, and an image display element, have ideal optical characteristics, and cause leak light which is different according to incident polarized light and the incident angle. FIG. 8 illustrates one example of the optical characteristic of the polarization beam splitter. It is understood that the p-polarized light is deteriorated in the transmission and the s-polarized light is deteriorated in the reflection over all incident angles including the ideal incident angle of 45°.

The interference pattern occurs with the same wavelength. The interference pattern occurs when a light flux of color light is split into a normal optical path and a non-normal optical path due to the leak light of the optical component, the split light fluxes again immerge, and the distance between the normal optical path and non-normal optical path falls within a predetermined distance (coherent distance L). For example, a description will be given of the B light with reference to FIG. 7. The B light incident as p-polarized light upon the PBS 15 transmits the PBS 15, and passes the B-use optical path as the normal optical path. However, a small amount of B light is reflected on the PBS 15, and passes the R-use optical path as the non-normal optical path. When these light fluxes are reflected on corresponding image display elements and again synthesized at the PBS 15, and when an optical path length difference between the normal optical path and the non-normal optical path falls within the predetermined distance, the interference pattern occurs. An optical path length from the polarization beam splitter 15 to each image display element for the B light will be calculated for each of the normal optical path and the non-normal optical path. Table 2 summarizes numerical values.

The optical path length of the normal optical path for the B light is 6.0 mm. The non-normal optical path has the same length of 2.0 mm as the normal optical path from the polarization beam splitter 15 to the phase plate 18. However, a distance from the phase plate 18 to the R-use image display element 19 is as long as 3.1853 mm as described above, and the phase plate 18 is as long as 1.5/1.894=0.792 mm. Therefore, the total is 5.9773 mm.

Therefore, a length difference between the normal optical path and the non-normal optical path is 22.7 μm for the B light.

Similarly, a length difference between the normal optical path and the non-normal optical path is −22.8 μm for the R light. Table 3 summarizes numerical values.

The coherent distance of the light source 1 used for this optical system is about 30 μm, and no interference pattern occurs when there is an optical path length difference of about 15 μm or larger on one side between the polarization beam splitter 15 and the image display element. When another light source different from the light source 1 is used, if it has a coherent distance of about 30 μm or smaller, no interference pattern occurs when there is an optical path length difference of about 15 μm or larger on one side between the polarization beam splitter 15 and the image display element.

Hence, this embodiment can avoid an interference pattern even with an achromatic projection lens.

Figure 9:
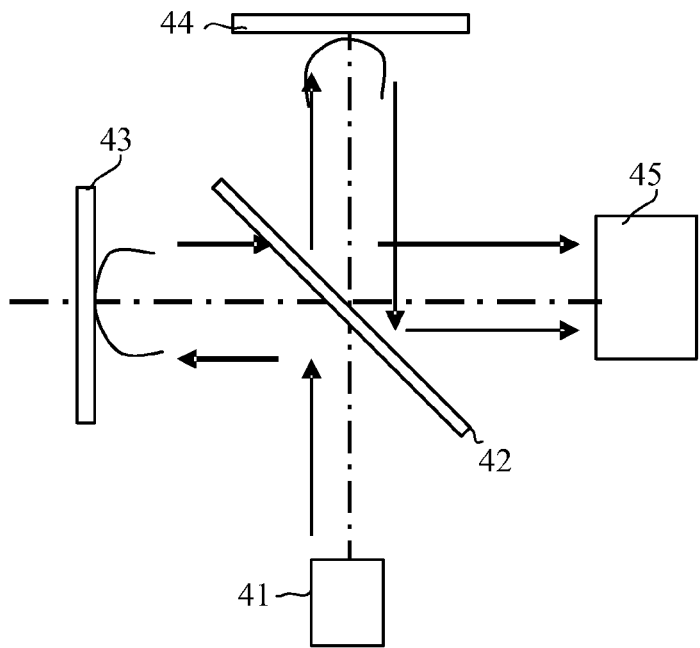
FIG. 9 is a view illustrating an optical element using a principle of a Michelson interferometer.

Referring now to FIG. 9, a description will be given of a calculation of a coherent distance. FIG. 9 illustrates an optical system utilizing a principle of a Michelson interferometer. Reference numeral 41 denotes a light source, reference numeral 42 denotes a half-mirror, reference numeral 43 denotes a first mirror, reference numeral 44 denotes a second mirror, and reference numeral 45 denotes a light receiving unit. In the optical operation, light from the light source 41 is split by the half-mirror 42, and the light reflected on the half-mirror 42 is reflected on the first mirror 43, then transmits the half-mirror 42, and reaches the light receiving unit 45. On the other hand, the light that has transmitted the half-mirror 42 is reflected on the second mirror 44, is reflected on the half-mirror 42, and reaches the light receiving unit 45. The light that has been reflected on the half-mirror 42 and the light that has transmitted the half-mirror 42 are synthesized by the half-mirror and interfere with each other when an optical path length between both optical paths is equal to or smaller than the predetermined distance. This predetermined distance will be referred to as a coherent distance. One calculating method of the coherent distance is to fix one of the first mirror 43 and the second mirror 44, and to shift the other mirror in the optical axis direction. The coherent distance corresponds to a shift amount range in which the interference pattern occurs and disappears.

In the first embodiment, conditions that satisfy the effect of this embodiment are formulated as follows:

In this embodiment, the length distance between the normal optical path and the non-normal optical path is 22.7 μm for the B light, and the length distance between the normal optical path and the non-normal optical path is 22.8 μm for the R light. Each length difference between the normal optical path and the non-normal optical path may be set larger, but there is no specific influence upon the interference pattern. Conversely, such a configuration would increase a size of the optical system and the cost. Hence, the length difference between the normal optical path and the non-normal optical path may be ten times as large as the coherent distance (or 5 L) or smaller.

$$5L \geq \mathrm{ABS}\left\{D \times \left(\frac{1}{n_{22}} - \frac{1}{n_{21}}\right)\right\} \geq \frac{L}{2} \quad \text{(Expression 1)}$$

$$5L \geq \mathrm{ABS}\left\{D \times \left(\frac{1}{n_{11}} - \frac{1}{n_{12}}\right)\right\} \geq \frac{L}{2}$$

n11 is a refractive index of the first parallel plate for a gravity center wavelength λ1 of the first color light;
n12 is a refractive index of the first parallel plate for a gravity center wavelength λ2 of the second color light;
n21 is a refractive index of the second parallel plate for a gravity center wavelength λ1 of the first color light;
n22 is a refractive index of the second parallel plate for a gravity center wavelength λ2 of the second color light;
D (μm) is a thickness of the parallel plate;
L (μm) is a coherent distance of the light source:

TABLE 2

Optical path length of each of normal optical path and non-abnormal optical path for B

|  | Normal optical path for B light | | | Non-normal optical path for B light | | |
| --- | --- | --- | --- | --- | --- | --- |
|  | d | n | In air | d | n | In air |
| PBS-phase plate | 2 | 1 | 2 | 2 | 1 | 2 |
| Phase plate | 1.5 | 1.894 | 0.792 | 1.5 | 1.894 | 0.792 |
| Phase plate to panel | 3.208 | 1 | 3.208 | 3.1853 | 1 | 3.185 |
| Total |  |  | 6.00 |  |  | 5.9773 |

*Unit of d in Table 2 is millimeter

TABLE 3

Optical path length of each of normal optical path and non-abnormal optical path for R

|  | Normal optical path for R light | | | Non-normal optical path for R light | | |
| --- | --- | --- | --- | --- | --- | --- |
|  | d | n | In air | d | n | In air |
| PBS-phase plate | 2 | 1 | 2 | 2 | 1 | 2 |
| Phase plate | 1.5 | 1.841 | 0.815 | 1.5 | 1.841 | 0.815 |
| Phase plate to panel | 3.1853 | 1 | 3.185 | 3.208 | 1 | 3.208 |
| Total |  |  | 6.00 |  |  | 6.0228 |

*Unit of d in Table 3 is millimeter

Second Embodiment

This embodiment can remarkably improve a degree of freedom of glass by slightly sacrificing color-erasing conditions without sacrificing the resolving power of the projection lens. In the following embodiment, the present invention is applied in accordance with the color erasing condition.

This embodiment also uses the image projection apparatus illustrated in FIG. 1. The differences from the first embodiment are a characteristic of the projection lens and a fixing position of each image display element.

Figure 10:
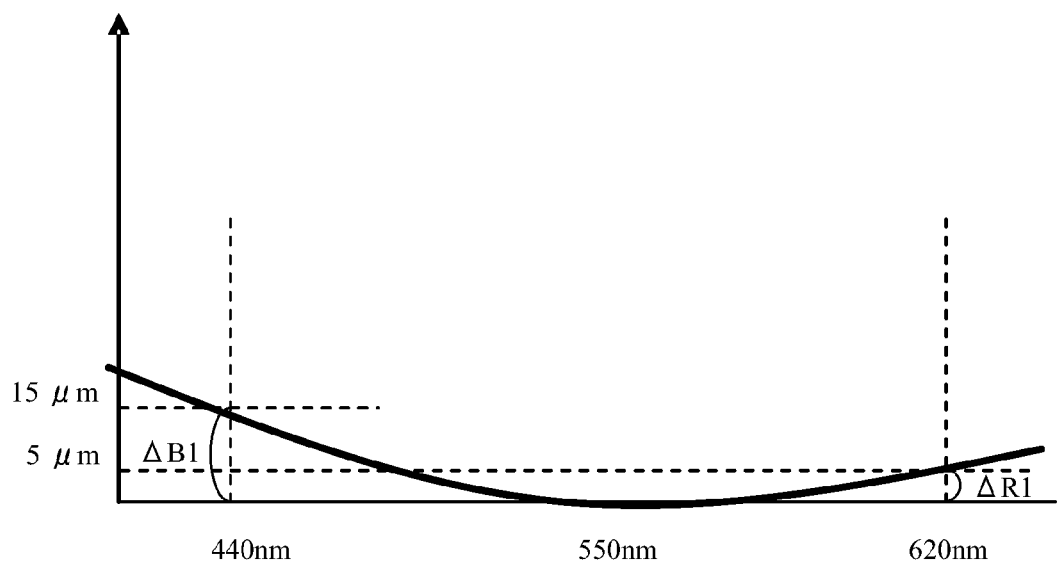
FIG. 10 illustrates a characteristic of a longitudinal chromatic aberration of a projection used for second and third embodiments.

FIG. 10 illustrates a characteristic of the longitudinal chromatic aberration of the projection lens used for this embodiment.

Even in this embodiment, the B light has a gravity center wavelength of 440 nm, the G light has a gravity center wavelength of 550 nm, and the R light has a gravity center wavelength of 620 nm. As illustrated in FIG. 10, a longitudinal chromatic aberration amount ΔB1 (T1) for the gravity center wavelength of the B light of the projection lens used for this embodiment is 15 μm. A longitudinal chromatic aberration amount ΔR1 (T2) for the gravity center wavelength of the R light have the same value of 5 μm. A longitudinal chromatic aberration of 10 μm is generated between the gravity center wavelength of the B light and the gravity center wavelength of the R light.

A thickness d of each phase plate is 1.5 mm, and a glass material used for the parallel plate 31 is S-TIM22. The refractive index of the glass material is 1.673 for 440 nm, and 1.645 for 620 nm.

Similar to the first embodiment, a fixing position of each image display element will be calculated.

Similar to the first embodiment, an interval between the polarization beam splitter and each phase plate is set to 2.0 mm.

A distance (in air) from the polarization beam splitter 15 to each image display element is 6.0 mm for the R optical path, and 6.01 mm for the B optical path. This difference is caused by the color erasing condition of the projection lens.

A fixing position will be calculated. Table 4 summarizes numerical values.

Initially, in the calculation of the image display element 17 for the B light, a distance from the phase plate 16 to the B-use image display element 17 is 6.01 mm-2.0 mm-1.5/1.673=3.113 mm. 1.673 is the refractive index n11 of the phase plate 16 for the gravity center wavelength of the B light.

in the calculation of the image display element 19 for the R light, a distance from the phase plate 18 to the R-use image display element 19 is 6.0 mm-2.0 mm-1.5/1.645=3.088 mm. 1.645 is the refractive index n22 of the phase plate 18 for the gravity center wavelength of the R light.

Next, a length difference between the normal optical path and the non-normal optical path for the B light will be calculated. Table 5 summarizes numerical values.

The normal optical path is as long as 6.01 mm. The non-normal optical path is as long as 2.0+1.5/1.673+3.088=5.985 mm. Thus, a length difference between the normal optical path and the non-normal optical path is 0.025 mm=25 μm. 1.673 is the refractive index n21 of the phase plate 18 for the gravity center wavelength of the B light.

Similarly, a length difference between the normal optical path and the non-normal optical path for the R light will be calculated. Table 6 summarizes numerical values.

The normal optical path is as long as 6.0 mm. The non-normal optical path is as long as 2.0+1.5/1.645+3.113=6.025 mm. Thus, a length difference between the normal optical path and the non-normal optical path is 0.025 mm=25 μm. 1.645 is the refractive index n12 of the phase plate 16 for the gravity center wavelength of the R light.

Hence, this embodiment can avoid the interference pattern and thereby remarkably improve a degree of freedom of glass by slightly sacrificing color-erasing conditions without sacrificing the resolving power of the projection lens.

TABLE 4

Fixing positions of the B and R panels

|  | B panel fixing position | | | R panel fixing position | | |
|---|---|---|---|---|---|---|
|  | d | n | In air | d | n | In air |
| PBS-phase plate | 2 | 1 | 2 | 2 | 1 | 2 |
| Phase plate | 1.5 | 1.673 | 0.897 | 1.5 | 1.645 | 0.912 |
| Phase plate to panel | 3.113 | 1 | 3.113 | 3.0881 | 1 | 3.088 |
| Total |  |  | 6.01 |  |  | 6.00 |

*Unit of d in Table 4 is millimeter

TABLE 5

Optical path length of each of normal optical path and non-abnormal optical path for B

|  | Normal optical path for B light | | | Non-normal optical path for B light | | |
|---|---|---|---|---|---|---|
|  | d | n | In air | d | n | In air |
| PBS-phase plate | 2 | 1 | 2 | 2 | 1 | 2 |
| Phase plate | 1.5 | 1.673 | 0.8966 | 1.5 | 1.673 | 0.8966 |
| Phase plate to panel | 3.113 | 1 | 3.113 | 3.0881 | 1 | 3.088 |
| Total |  |  | 6.01 |  |  | 5.985 |

*Unit of d in Table 5 is millimeter

TABLE 6

Optical path length of each of normal optical path and non-abnormal optical path for R

|  | Normal optical path for R light | | | Non-normal optical path for R light | | |
|---|---|---|---|---|---|---|
|  | d | n | In air | d | n | In air |
| PBS-phase plate | 2 | 1 | 2 | 2 | 1 | 2 |
| Phase plate | 1.5 | 1.645 | 0.912 | 1.5 | 1.645 | 0.912 |
| Phase plate to panel | 3.0881 | 1 | 3.088 | 3.113 | 1 | 3.113 |
| Total |  |  | 6.00 |  |  | 6.025 |

*Unit of d in Table 6 is millimeter

Third Embodiment

Similar to the second embodiment, this embodiment uses the image projection apparatus illustrated in FIG. 1, and the projection lens having a longitudinal chromatic aberration illustrated in FIG. 10. The difference from the second embodiment is that the glass material of the parallel plate 31 is different between the phase plate 16 and the phase plate 18. The thickness of the phase plate 16 is also different from that of the phase plate 18.

Even in this embodiment, the B light has a gravity center wavelength of 440 nm, the G light has a gravity center wavelength of 550 nm, and the R light has a gravity center wavelength of 620 nm. As illustrated in FIG. 10, a longitudinal chromatic aberration amount ΔB1 (T1) of the projection lens used for this embodiment for the gravity center wavelength of the B light is 15 μm. A longitudinal chromatic aberration amount ΔR1 (T2) for the gravity center wavelength of the R light have the same value of 5 μm. A longitudinal chromatic aberration of 10 μm is generated between the gravity center wavelength of the B light and the gravity center wavelength of the R light.

The thickness D1 of the B-use phase plate 16 is 2.0 mm, and the thickness D2 of the R-use phase plate 18 is 1.5 mm. The glass material used for the B-use phase plate 16 is S-TIM22, and the glass material used for the R-use phase plate 18 is S-LAH79. The refractive index of S-TIM22 is 1.673 for 440 nm, and 1.645 for 620 nm. The refractive index of S-LAH79 is 2.05 for 440 nm, and 1.998 for 620 nm.

Similar to the first and second embodiments, a fixing position of each image display element will be calculated.

Similar to the first and second embodiments, an interval between the polarization beam splitter and each phase plate is set to 2.0 mm.

A distance (in air) from the polarization beam splitter 15 to each image display element is 6.0 mm for the R optical path, and 6.01 mm for the B optical path. This difference is caused by the color erasing condition of the projection lens.

A fixing position will be calculated. Table 7 summarizes numerical values.

Initially, in the calculation of the image display element 17 for the B light, a distance from the phase plate 16 to the B-use image display element 17 is 6.01 mm-2.0 mm-2.0/1.673=2.815 mm. 1.673 is the refractive index n11 of the phase plate 16 for the gravity center wavelength of the B light.

In the calculation of the image display element 19 for the R light, a distance from the phase plate 18 to the R-use image display element 19 is 6.0 mm-2.0 mm-1.5/1.998=3.249 mm. 1.998 is the refractive index n22 of the phase plate 18 for the gravity center wavelength of the R light.

Next, a length difference between the normal optical path and the non-normal optical path for the B light will be calculated. Table 8 summarizes numerical values.

The normal optical path is as long as 6.01 mm. The non-normal optical path is as long as 2.0+1.5/2.05+3.249=5.981 mm. Thus, a length difference between the normal optical path and the non-normal optical path is 0.029 mm=29 μm. 2.05 is the refractive index n21 of the phase plate 18 for the gravity center wavelength of the B light.

Similarly, a length difference between the normal optical path and the non-normal optical path for the R light will be calculated. Table 9 summarizes numerical values.

The normal optical path is as long as 6.0 mm. The non-normal optical path is as long as 2.0+2.0/1.645+2.815=6.03 mm. Thus, a length difference between the normal optical path and the non-normal optical path is 0.03 mm=30 μm. 1.645 is the refractive index n12 of the phase plate 16 of the gravity center wavelength of the R light.

Hence, this embodiment can also avoid the interference pattern.

Thus, this embodiment can avoid the interference pattern without causing a large longitudinal chromatic aberration in the projection lens, and provide an image projection apparatus that can reduce the chromatic blur. In addition, this embodiment is free of a restraint of the predetermined chromatic aberration to be generated in the conventional projection lens design, and can improve the imaging performance without considering the interference pattern.

TABLE 7

Fixing positions of the B and R panels

|  | B panel fixing position | | | R panel fixing position | | |
|---|---|---|---|---|---|---|
|  | d | n | In air | d | n | In air |
| PBS-phase plate | 2 | 1 | 2 | 2 | 1 | 2 |
| Phase plate | 2 | 1.673 | 1.195 | 1.5 | 1.998 | 0.751 |
| Phase plate to panel | 2.815 | 1 | 2.815 | 3.249 | 1 | 3.249 |
| Total |  |  | 6.01 |  |  | 6.00 |

*Unit of d in Table 7 is millimeter

TABLE 8

Optical path length of each of normal optical path and non-abnormal optical path for B

|  | Normal optical path for B light | | | Non-normal optical path for B light | | |
| --- | --- | --- | --- | --- | --- | --- |
|  | d | n | In air | d | n | In air |
| PBS-phase plate | 2 | 1 | 2 | 2 | 1 | 2 |
| Phase plate | 2 | 1.673 | 1.195 | 1.5 | 2.05 | 0.7317 |
| Phase plate to panel | 2.815 | 1 | 2.815 | 3.249 | 1 | 3.249 |
| Total |  |  | 6.01 |  |  | 5.981 |

*Unit of d in Table 8 is millimeter

TABLE 9

Optical path length of each of normal optical path and non-abnormal optical path for R

|  | Normal optical path for R light | | | Non-normal optical path for R light | | |
| --- | --- | --- | --- | --- | --- | --- |
|  | d | n | In air | d | n | In air |
| PBS-phase plate | 2 | 1 | 2 | 2 | 1 | 2 |
| Phase plate | 1.5 | 1.998 | 0.751 | 2 | 1.645 | 1.216 |
| Phase plate to panel | 3.249 | 1 | 3.249 | 2.815 | 1 | 2.8145 |
| Total |  |  | 6.00 |  |  | 6.030 |

*Unit of d in Table 9 is millimeter

In the second and third embodiments, the conditions that provide the effects of the present invention will be formulated as follows:

$$5L \geq \text{ABS}\left\{(T_1 - T_2) + D_2 \times \left(\frac{1}{n_{22}} - \frac{1}{n_{21}}\right)\right\} \geq \frac{L}{2} \quad \text{(Expression 2)}$$

$$5L \geq \text{ABS}\left\{(T_2 - T_1) + D_1 \times \left(\frac{1}{n_{11}} - \frac{1}{n_{12}}\right)\right\} \geq \frac{L}{2}$$

$$(T_2, T_1) \leq 20 \ \mu m$$

n11 is a refractive index of the first parallel plate for a gravity center wavelength λ1 of the first color light,
n12 is a refractive index of the first parallel plate for a gravity center wavelength λ2 of the second color light,
n21 is a refractive index of the second parallel plate for a gravity center wavelength λ1 of the first color light,
n22 is a refractive index of the second parallel plate for a gravity center wavelength λ2 of the second color light,
D1 (μm) is a thickness of the first parallel plate in an optical axis direction,
D2 (μm) is a thickness of the second parallel plate in the optical axis direction,
T1 (μm) is a longitudinal chromatic aberration of the gravity center wavelength λ1 of the first color light based on a gravity center wavelength λ3 of third color light different from each of the first color light and the second color light,
T2 (μm) is a longitudinal chromatic aberration of the gravity center wavelength λ2 of the second color light based on the gravity center wavelength λ3 of third color light,
L (μm) is a coherent distance of the light source.

In Expression 2, the longitudinal chromatic aberrations T1 and T2, and the refractive indexes n11, n12, n21, and n22 may satisfy one of T1>T2 and n21>n22 and n11>n12, and T2>T1 and n22>n21 and n12>n11 so as to easily avoid the interference pattern.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-167195, filed Jul. 26, 2010, which is hereby incorporated by reference herein in its entirety.

The color splitting optical system is applicable to the image projection apparatus, and the image projection apparatus is applicable to an application of projecting an image.

What is claimed is:

1. An image projection apparatus comprising:
a projection lens configured to project an image onto a projection surface;
a beam splitter configured to split light from a light source into first color light and second color light;
a first reflective image display element configured to optically modulate the first color light;
a second reflective image display element configured to optically modulate the second color light;
a first parallel plate arranged between the beam splitter and the first reflective image display element; and
a second parallel plate arranged between the beam splitter and the second reflective image display element,
wherein the following expressions are satisfied:

$$5L \geq \text{ABS}\left\{(T_1 - T_2) + D_2 \times \left(\frac{1}{n_{22}} - \frac{1}{n_{21}}\right)\right\} \geq \frac{L}{2}$$

$$5L \geq \text{ABS}\left\{(T_2 - T_1) + D_1 \times \left(\frac{1}{n_{11}} - \frac{1}{n_{12}}\right)\right\} \geq \frac{L}{2}$$

$$-20 \ \mu m \leq T_1 \leq 20 \ \mu m$$

$$-20 \ \mu m \leq T_2 \leq 20 \ \mu m, \text{ and}$$

where n11 is a refractive index of the first parallel plate for a gravity center wavelength λ1 of the first color light, n12 is a refractive index of the first parallel plate for a gravity center wavelength λ2 of the second color light, n21 is a refractive index of the second parallel plate for a gravity center wavelength λ1 of the first color light, n22 is a refractive index of the second parallel plate for a gravity center wavelength λ2 of the second color light, D1 (μm) is a thickness of the first parallel plate in an optical axis direction, D2 (μm) is a thickness of the second parallel plate in the optical axis direction, T1 (μm) is a longitudinal chromatic aberration of the gravity center wavelength λ1 of the first color light based on a gravity center wavelength λ3 of third color light different from each of the first color light and the second color light, T2 (μm) is a longitudinal chromatic aberration of the gravity center wavelength λ2 of the second color light based on the gravity center wavelength λ3 of third color light, and L (μm) is a coherent distance of the light source, and
wherein the gravity center wavelength is a wavelength corresponding to a center of gravity calculated from a product between a spectrum of a light flux emitted from the image projection apparatus and a color matching function.

2. The image projection apparatus according to claim 1, wherein the longitudinal chromatic aberrations T1 and T2, and the refractive indexes n11, n12, n21, and n22 satisfy one of:

T1>T2 and n21>n22 and n11>n12 or

T2>T1 and n22>n21 and n12>n11.

3. The image projection apparatus according to claim 1, wherein the first parallel plate is made of a glass material different from that of the second parallel plate.

4. The image projection apparatus according to claim 1, wherein the coherent distance L is 30 μm or smaller.

5. The image projection apparatus according to claim 1, wherein the first color light belongs to a blue band and the second color light belongs to a red band.

6. The image projection apparatus according to claim 1, wherein each of the first and second reflective image display elements is one of LCOS and DLP.

7. The image projection apparatus according to claim 1, wherein the coherent distance L is 30 μm or smaller.

8. The image projection apparatus according to claim 1, wherein the first color light belongs to a blue band and the second color light belongs to a red band.

9. An image projection apparatus comprising:
   a projection lens configured to project an image onto a projection surface;
   a beam splitter configured to split light from a light source into first color light having a gravity center wavelength λ1 and second color light having a gravity center wavelength λ2;
   a first reflective image display element configured to optically modulate the first color light;
   a second reflective image display element configured to optically modulate the second color light;
   a first parallel plate arranged between the beam splitter and the first reflective image display element; and
   a second parallel plate arranged between the beam splitter and the second reflective image display element,
   wherein, when an air conversion length in the first color light having the gravity center wavelength λ1 between the beam splitter and the first reflective image display element is defined as a first air conversion length and an air conversion length in the first color light having the gravity center wavelength λ1 between the beam splitter and the second reflective image display element is defined as a second air conversion length, a difference between the first air conversion length and the second air conversion length is at least a half of a coherent distance of the light source.

10. The image projection apparatus according to claim 9, wherein, when an air conversion length in the second color light having the gravity center wavelength λ2 between the beam splitter and the second reflective image display element is defined as a third air conversion length and an air conversion length in the second color light having the gravity center wavelength λ2 between the beam splitter and the first reflective image display element is defined as a fourth air conversion length, a difference between the third air conversion length and the fourth air conversion length is at least the half of the coherent distance.

11. The image projection apparatus according to claim 9, wherein a longitudinal chromatic aberration in the projection lens for the gravity center wavelength λ1 and a longitudinal chromatic aberration in the projection lens for the gravity center wavelength λ2 are different from each other.

12. The image projection apparatus according to claim 9, wherein, when a longitudinal chromatic aberration in the projection lens for the gravity center wavelength λ1 of the first color light based on a gravity center wavelength λ3 of third color light different from each of the first color light and the second color light is defined as T1 (μm) and a longitudinal chromatic aberration in the projection lens for the gravity center wavelength λ2 of the second color light based on a gravity center wavelength λ3 of the third color light is defined as T2 (μm), an absolute value of each of T1 and T2 is 20 μm or smaller.

13. The image projection apparatus according to claim 9, wherein the beam splitter is configured to split the light from the light source into the first color light and the second color light and to combine the first color light and the second color light that have been reflected by the first and second reflective image display elements.

14. The image projection apparatus according to claim 9, wherein no polarization beam splitter or dichroic mirror exists in a light path between the beam splitter and the first reflective image display element and in a light path between the beam splitter and the second reflective image display element.

15. The image projection apparatus according to claim 9, further comprising:
   a third reflective image display element configured to optically modulate a third color light different from each of the first color light and the second color light;
   a sub beam splitter configured to split the second color light from a light path of the first and second color light, and arranged closer to the light source than the beam splitter; and
   a polarization beam splitter configured to introduce to the third reflective image display element the third color light that has been emitted from the sub beam splitter and to selectively introduce to the projection lens the third color light that has been emitted from the third reflective image display element.

* * * * *